Patented Dec. 12, 1950

2,533,246

UNITED STATES PATENT OFFICE 2,533,246

PRODUCTION OF LITHIUM CHLORIDE FROM SPODUMENE

Earl T. Hayes and Frank P. Williams, Salt Lake City, Utah, and Woldemar M. Sternberg, Long Beach, Calif.

No Drawing. Application March 11, 1947, Serial No. 733,980

7 Claims. (Cl. 23—89)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to the production of lithium salts and it particularly relates to the production of lithium salts from lithium bearing silicate minerals or ores. It still more particularly relates to the recovery of pure lithium values from spodumene.

Spodumene, a widely occurring lithium mineral, believed to be $Li_2O \cdot Al_2O_3 \cdot 4Si \cdot O_4$, has been recognized as a good potential source of lithium compound. However, it is not as susceptible to treatment as lepidolite and amblygonite and heretofore has not been employed as a commercial source of lithia.

Accordingly, it is an object of this invention to provide a method for the production of lithium salts from spodumene. It is another object of this invention to provide a method for the production of pure lithium salts. Other objects and advantages will be apparent or will appear hereinafter.

These objects are accomplished in accordance with this invention wherein a mixture of lithium bearing silicate mineral, limestone, and calcium sulfate is subjected to treatment at elevated temperatures whereby the lithium values are substantially rendered water soluble and amenable to recovery by leaching.

Suitable lithium bearing silicate minerals or ores which can be processed in accordance with this invention include lepidolite, amblygonite, petalite, spodumene, and the like. However, since lepidolite and amblygonite can be readily processed by methods which are uneconomical in treating spodumene, the ensuing discussion will be primarily concerned, though not limited thereto, with a process for the treatment of spodumene. By this invention, it has been found that the lithium values in spodumene and like minerals are rendered soluble by treatment with a mixture of a calcerous material which readily yields calcium oxide on roasting and calcium sulfate.

Suitable calcerous materials for purposes of this invention include limestone, calcite, marble, chalk, calcium carbonate, calcium hydroxide, and like materials which readily yield calcium oxide on roasting. Limestone is presently preferred for economic reasons. Replacing half of the calcium carbonate with magnesium carbonate had no detrimental effect on the extraction or purification; hence, dolomite, dolomitic limestone, and the like may be used in this process.

The calcium sulfate suitable for purposes of this invention can be the pure compound or materials containing calcium sulfate such as plaster of Paris, gypsum, and the like. For reasons of economy gypsum is presently preferred.

Since the reaction on treatment is believed to be

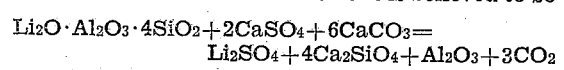
$$Li_2O \cdot Al_2O_3 \cdot 4SiO_2 + 2CaSO_4 + 6CaCO_3 = Li_2SO_4 + 4Ca_2SiO_4 + Al_2O_3 + 3CO_2$$

it is presently preferred to employ the materials in approximate stoichiometric quantities based on the lithia content of the mineral. Thus, a mixture or roasting charge of about 5 parts spodumene, about 5 parts limestone, and about 3 parts calcium sulfate (or corresponding weight of gypsum) has been found to give good recovery of the lithium values. However, the process is operable when from about 4 to 6 parts of spodumene, about 4 to 6 parts limestone, and 2 to 4 parts calcium sulfate are employed.

Since the effectiveness of the conversion of the lithium values to soluble salts depends to a large extent on the intimacy of contact of the various components of the roasting charge, it is presently preferred to mix the components and then grind the mixture to about minus 200 mesh. The grinding and mixing can be accomplished concurrently. Any suitable grinding means can be employed; however, wet grinding in a ball mill at a pulp density of about 50 percent was found to produce an intimately admixed charge of a uniform particle size. Before treating a roasting charge prepared by the wet-grind process, it was preferred to remove the grinding media and dry the charge to prevent caking. Good recovery of lithium values have been obtained by roasting a pelletized feed charge. Pellets about ½ to ¾ inch in diameter were prepared by adding approximately 2 percent bentonite and 8 to 10 percent water to the ground roasting charge and tumbling the mixture in a cement mixer from which the blades had been removed. Here too, it is presently preferred to remove the excess water and dry the pellets before roasting.

Suitable temperatures for roasting the feed charge are those not greater than temperatures at which the mixture will fuse; and preferably, as a safety precaution, slightly lower than the fusion temperature. Good recovery of the lithia has been obtained on roasting at temperatures between about 1000 to 1150 degrees centigrade.

The heating or roasting treatment should be continued for such a time as is necessary to substantially complete the interaction of the components and this time will depend on the temperature used. It must be understood that either lower or higher temperatures than those mentioned can be employed. At temperatures about 1100 degrees centigrade about two to three hours' roasting has been found to substantially convert the lithia to a water soluble form. Lower temperatures will generally require a longer roasting treatment; and conversely, higher temperatures will require a shorter roasting treatment. Suitable roasting means include batch type and continuous furnaces or kilns which can develop and maintain the charge at the temperature ranges employed. A natural gas direct fired rotary kiln has been found to be adequate for this purpose; however, roasting means are not limited thereto. Properly roasted products are sintered and not fused and show no tendency to cling to the walls of the kiln. They are granular in structure, if not roasted too long, can be leached without regrinding.

The leaching of the roasted product to extract soluble lithia can be carried out in any suitable leaching means adapted to the purpose. The leaching solvent can be water or an ionic solution which will react with the lithium sulfate to form a soluble lithium salt and an insoluble sulfate. Such solutions as calcium, strontium, barium, and the like; chlorides, nitrates, dithionate, and the like, will react in this manner and can be employed as leaching solutions. So too, certain lead salts such as the nitrate can be used; however, economics of the process must be considered. It is presently preferred to use either water or calcium chloride solutions since such leaching agents are cheap and produce good extractions of the lithia; and since by employing a calcium chloride leaching solution an extra filtration step is avoided without a concurrent decrease in the lithia extracted, it is advantageous to use this as the leaching solvent. An appreciable excess of calcium chloride should be avoided since unreacted calcium ions must be removed in order to finally obtain a pure lithium solution. When a stoichiometric quantity of calcium ion to react with sulfate ions present as lithium sulfate is present in the leach solution the extraction of the lithia has been found to be exceptionally satisfactory and only very small losses of lithia have occurred due to its retention in the insoluble residue.

The leaching can be carried out either on the hot roasted product or after it has cooled. It has been found possible to discharge the roasted spodumene-limestone-gypsum mixture directly from a rotary kiln into a leaching tank, and it is considered advantageous to do so as this appears to improve the leaching and filtering rates. Even here, it is somewhat desirable to permit the roasted reaction product to cool a bit before the actual discharge since smaller volumes of leaching solution can then be employed and thus permit the use of smaller apparatus for separating the insolubles.

The insolubles can be separated from the lithia solution by suitable solid-liquid phase separating means. Filtration is generally employed by centrifugal separation, decanting, and like processes can also be employed.

The liquid phase thereby separated is an impure lithium sulfate solution when water is the leaching solvent or an impure lithium chloride solution when calcium chloride solutions are used as leaches. The major impurities are generally sodium ions, potassium ions, calcium ions, and sulfate ions. The impure lithia solution is substantially free of magnesium, iron, alumina, phosphate, and fluoride. A typical impure lithia solution contains about 50 grams per liter lithium chloride, 21 grams per liter mixed sodium and potassium chlorides, 4 grams per liter lime, and 1.5 grams per liter of sulfate.

The purification of the impure lithia solution can be carried out in many ways. By this invention it has been found that it can be carried out conveniently by first removing the excess lime and sulfate. For a solution having the typical composition heretofore mentioned it was possible to remove the sulfate by the addition of about 6.5 pounds of barium chloride per 100 pounds of lithium chloride; the lithium loss in the barium sulfate precipitate is less than 0.15 per cent of the $Li_2O$. The calcium ions and any excess barium ions can be precipitated by the addition of carbonate ion; preferably in the form of lithium carbonate since no additional contaminants are thereby introduced and $LiCO_3$ is formed at a later stage in the process. These precipitated impurities can be conveniently separated by filtration or centrifuging; the filtrate now containing sodium and potassium ions as impurities. These contaminants are removed by an evaporation and crystallization step followed by an extraction step involving an organic solvent.

The solubilities of sodium and potassium chlorides in lithium chloride solution decrease rapidly with increasing concentration of lithium chloride, so that when the solution is concentrated by evaporation, the bulk of the sodium and potassium chlorides crystallizes out. In this procedure, when a solution of lithium, sodium, and potassium chlorides is evaporated to a boiling point of 147 degrees centigrade at 760 mm., the lithium chloride remains in solution with not more than 4 percent of its weight of sodium and potassium chlorides.

The solution remaining after the removal of calcium and sulfate contains about three parts of lithium chloride to one part of sodium chloride plus potassium chloride. Tests in which such a solution was evaporated to a boiling point of 142 degrees centigrade at 650 mm. and filtered hot gave a solution containing 56 percent lithium chloride and 1.5 percent sodium chloride plus potassium chloride; this represents a removal of approximately 93 percent of the sodium chloride plus potassium chloride. The resulting solution, however, is viscous and difficult to filter. It probably would be preferable to evaporate the original solution to a somewhat lower concentration and remove less sodium and potassium chloride at this stage.

The unwashed residue of sodium and potassium chlorides contains about 3 percent of the lithium. It is not necessary to wash the crystals, as the lithium can be recovered readily as lithium carbonate by precipitation with sodium carbonate. The lithium carbonate can then be used to precipitate the calcium and barium in the preliminary purification step, as explained previously.

The solubility of lithium chloride in most organic solvents such as isoamyl alcohol, n-hexanol, and 2-ethylhexanol is much greater than that of sodium or potassium chloride.

The 2-ethylhexanol is preferred as the solvent because of its favorable solubility relations and also because of other considerations, such as volatility, cost, non-hygroscopic nature, and odor. The solubility of water in 2-ethylhexanol is about 2 percent at 25 degrees centigrade and is greatly decreased by the presence of lithium chloride; the alcohol is virtually insoluble in water. Commercial grades of 2-ethylhexanol usually contain a small amount of the corresponding aldehyde, which causes them to become discolored when heated; the discoloration can be removed by filtering the alcohol through activated carbon.

The concentrated lithium chloride solution remaining after the removal of the bulk of the sodium and potassium chlorides is first evaporated virtually to dryness. The evaporation is carried out in a vacuum dryer, as, if the solution is evaporated at atmospheric pressure, bumping and spattering make the operation difficult, and the salts adhere tightly to the walls of the container.

The impure solid lithium chloride is introduced into hot 2-ethylhexanol, and the insoluble residue is filtered off. At 90 to 100 degrees centigrade, approximately 30 ml. of the alcohol is used for each gram of the salt; this volume is somewhat greater than that required to form a saturated solution, an excess being advisable to avoid crystallization of lithium chloride on the filtering medium. The lithium chloride need not be bone-dry for satisfactory extraction, but if an appreciable amount of moisture is present, two liquid layers form, with most of the lithium chloride in the lower (aqueous) layer. Lithium chloride is one of the most hygroscopic substances known, so care must be taken that the dried product be not exposed excessively to air before extraction.

The lithium chloride is extracted from the hot alcohol solution by distilled water. With an amount of water equal to 3 percent of the weight of the alcohol solution, 95 percent of the lithium chloride can be extracted in a single extraction. There is no need to remove the remaining lithium chloride, as the alcohol is recycled. The amount of water used is kept at a minimum because all of the water must subsequently be evaporated.

Attempts were made to carry out the extraction steps at room temperatures. The high viscosity of the 2-ethylhexanol at room temperature, however, interfered excessively with both the filtration of the alcohol extract and the settling of the water extract from the alcohol. The filtering and settling rates are much more rapid at 100 degrees centigrade; moreover, the circulating load of alcohol is lower at the higher temperature because of the increase in the solubility of lithium chloride.

The specific gravity of the water extract of lithium chloride is about 1.3, and that of the alcohol about 0.8. The viscosities of the liquids are low enough at 100 degrees centigrade to permit clean separation in a simple gravity separator or in a centrifuge. Because of the very low solubility of the alcohol in lithium chloride solution, the loss of alcohol in the aqueous extract is negligible.

The insoluble residue of sodium and potassium chlorides remaining after extraction of the lithium chloride need not be washed. It is combined with the corresponding product obtained in the evaporation step and treated with water to dissolve the chlorides and recover the alcohol adhering to the crystals. The alcohol is returned to the extraction circuit, and the aqueous solution is treated with sodium carbonate to recover the lithium as lithium carbonate, which is used in the preliminary purification step, as explained previously. If the amount of lithium carbonate formed is greater than required, the excess may be returned to the circuit at the calcium chloride leaching step.

The pure aqueous solution of lithium chloride resulting from the extraction of the alcohol solution with water is evaporated at atmospheric pressure to a concentration of about 60 percent, and then to dryness in a vacuum evaporator.

A typical analysis of lithium chloride produced from spodumene by this process is as follows:

|  | Percent |
| --- | --- |
| Potassium | Less than 0.01 |
| Sodium | 0.07 |
| Calcium | Less than 0.01 |
| Magnesium | Less than 0.01 |
| Iron | Less than 0.01 |

Recovery of between about 85 to 90 percent of the lithia from spodumene in the form of pure lithium chloride can be obtained when treatment is carried out in the following manner.

About 4 to 6 parts by weight spodumene, about 4 to 6 parts by weight limestone, and about 2 to 4 parts by weight calcium sulfate are suspended in sufficient water to form a pulp density of about 50 percent. The pulp is then wet ground in a ball mill until substantially all the solids are about minus 200 mesh (Tyler). Thereafter, the ground intimately mixed product is dewatered and dried. The dried mix is thereafter introduced into a rotary kiln and roasted at temperatures about 1100 degrees centigrade for about 2 to 3 hours. The roasted product is then discharged into a leaching tank containing water and about the theoretical quantity calcium chloride to react with the lithium sulfate present calculated from the lithia content of the mineral. Thereafter, the liquid phase containing soluble lithium values is separated from the insolubles by filtration; the leach liquor is retained and the insolubles discarded. Thereafter, the leach liquor is transferred to a precipitator tank and sufficient barium chloride solution is added to precipitate the sulfate ions still remaining in solution. The solution is then treated with sufficient lithium carbonate to precipitate the calcium ions and barium ions as carbonates. The lithium solution is filtered and retained and the insolubles can be recycled through the roasting process. Thereafter, the lithium solution is transferred to a suitable evaporating means and heated to boiling temperature at atmospheric pressure to drive off water. This evaporation is continued until a sufficiently concentrated lithium chloride solution is produced in which the sodium and potassium chlorides are insolubilized and precipitate. The insoluble sodium and potassium chlorides are then separated by filtration and the filtrate and residues are collected; the lithium chloride is thereafter evaporated to dryness in a vacuum dryer. The impure solid lithium chloride is then extracted in a suitable extracting means with a hot organic solvent, such as 2-ethylhexanol, and the undissolved potassium and sodium chlorides are filtered off and combined with the chloride residue from the first evaporation step. These combined salt residues are transferred to a suitable extraction vessel and treated with water, and the solvent separated thereby is recycled to the lithium chloride extractor. The aqueous salt solution is treated with sodium carbonate and the lithium carbonate thereby precipitated is filtered, collected, recycled to the previous barium precipitation step; the filtrate is discarded. The organic solvent solution of lithium chloride is then transferred to a suitable extraction vessel and treated with water. The two liquid phases are allowed to separate the pure lithium chloride now appearing in the aqueous solution. The 2-ethylhexanol is separated from the pure lithium chloride solution and recycled through the extraction steps. The pure lithium chloride solution is evaporated at atmospheric pressure to a concentration of about 60 percent and then to dryness in a vacuum dryer.

The following examples show how the invention may be carried out, but it is not limited thereto.

*Example I*

Twenty-eight pounds of spodumene, containing 5.4 percent $Li_2O$, were wet ball milled with 28 pounds of limestone and 19 pounds of gypsum. The wet mass was dried and loaded into a rotating batch kiln. The kiln was fired at 9:30 a. m., a temperature of 1025 degrees was reached at 11:00 a. m. and the heating continued until 3:00 p. m. Samples taken at 1:00 p. m. had 61 percent of the lithium in a soluble form, at 2:00 p. m.—82 percent, and at 3:00 p. m.—60 percent, showing that the optimum time of roasting was around 3:00 p. m. at 1025–1075 degrees. Tests were made on water extracts of weighed samples.

Seven and one-half pounds of the roast were extracted with water. The solution was found to be free from $SiO_2$, $P_2O_5$, F, $R_2O_3$ and MgO, and contained a total of 55 grams $Li_2O$, 213 grams of sulfate ions, 58 grams of combined Na and K, weighed as chlorides, and a small amount of CaO, which gave it an alkaline reaction.

Three hundred and twenty-five grams of $CaCl_2 \cdot 2H_2O$ were dissolved in double their weight of water, and 365 grams of $CaSO_4 \cdot 2H_2O$ were filtered off. It was found to contain 0.15 percent $Li_2O$, or a total of 0.6 gram, representing an apparent loss of over 1 percent of the lithium extracted. This $CaSO_4 \cdot 2H_2O$ can of course be used over in subsequent roasting of the ore, and the lithium recovered.

A twenty percent $BaCl_2 \cdot 2H_2O$ solution was next used to precipitate the remaining $SO_4$ (weight of $BaSO_4$ collected was 42 grams, with 0.15 percent $Li_2O$ contamination), and the excess Ba ions added, as well as the Ca ions present were precipitated with 20 grams of $Li_2O_3$. The weight of $CaCO_3 + BaCO_3$ was 19.3 grams, and was quite heavily contaminated with $Li_2O$(3.45%). This mixture may also be returned to the kiln and the lithium values recovered.

The solution at this point had a volume of around 4000 ml. and was concentrated by evaporation to about 270 ml., when the boiling point of 650 mm. mercury reached 142 degrees. NaCl and KCl were in part precipitated, and filtered off, but not washed. They were saved to be combined with a later crop, to be obtained in the final purification, dissolved in water, and the adhering lithium carbonate precipitated with sodium carbonate at the boiling point. The lithium carbonate formed would be used in a preceding purification step.

The filtrate was evaporated under 10″ of vacuum. Total impure LiCl collected was 147 grams, and contained three and one-half per cent moisture and two and one-half per cent (Na+K)Cl. Subtracting from that the equivalent of 20 grams of $Li_2CO_3$ added to precipitate $BaCO_3 + CaCO_3$, and adding the amounts left with $CaSO_4 \cdot CH_2O$, the carbonates and with the (Na+K)CO (25 grams), we get a total of 144.3 grams, or 55.7 per cent of the lithium chloride present in the batch. Since in the sample extracted only 60 per cent were converted into the soluble form, 93 per cent have been recovered as the chloride.

The final purification consists in dissolving the LiCl in hot 2-ethylhexanol, which dissolves about 4 per cent LiCl at 100 degrees centigrade, and mere traces of NaCl and KCl, and recovering the LiCl from the alcohol extract.

In other experiments on roasting higher temperatures, up to 1150 degrees have been used, with somewhat higher extractions, up to 90 per cent, at the optimum length of roasting. The amount of lithium extracted appeared to pass through a maximum and then declined with increasing length of heating.

*Example II*

Using the same roasted material as in Example I, 7½ pounds were extracted with a solution of 8 pounds $CaCl_2$ (hydrated) in 6 pounds of water. Total $Li_2O$ extracted—60 grams.
Composition of solution:

LiCl=63 gm. per liter
NaCl+KCl=30 gm. per liter
$CaCl_2$=9 gm. per liter
$CaSo_4$=1.7 gm. per liter Alkalinity of solution—0.7 gm. CaO per liter.
Tests for $SiO_2$, $PO_4$, F, $R_2O_3$ and MgO were negative.

This solution was purified as outlined above. The solution contained an appreciable excess of $CaCl_2$—some 7 per cent of the total used. Otherwise, the solution was very similar to the one shown in Example I, except that the total LiCl extracted was somewhat higher, and corresponded to 61.4 per cent while extracting with water only 59.5 per cent were extracted.

This method offers the advantages of somewhat higher extraction, simplified procedure, lesser requirements in equipment, and smaller working volumes of solutions.

From the foregoing, it is apparent that a desirable method for the recovery of pure lithium values from spodumene has been provided.

Since many widely differing embodiments of this invention will occur to one skilled in the art, it is not limited to the specific details illustrated or described, and various changes can be made therein without departing from the spirit and scope thereof.

What is claimed is:

1. A process for the production of water soluble lithium compounds which comprises subjecting a mixture of about 4 to 6 parts by weight of a lithium bearing silicate, about 4 to 6 parts by weight of limestone, and about 2 to 4 parts by weight of calcium sulphate, having a particle size of about minus 200 mesh to treatment at temperatures of about 1000 to 1500 degrees centigrade, and leaching the calcined mixture with water to recover the water soluble lithium compound.

2. A process for the production of water soluble lithium compounds which comprises subjecting a mixture of about 4 to 6 parts by weight of spodumene, about 4 to 6 parts by weight of limestone, and about 2 to 4 parts by weight of calcium sulphate, having a particle size of about minus 200 mesh to treatment at temperatures of about 1000 to 1500 degrees centigrade, and leaching the calcined mixture with water to recover the water soluble lithium compound.

3. A process for the production of lithium chloride which comprises subjecting a mixture of about 4 to 6 parts by weight of lithium bearing silicate, about 4 to 6 parts by weight of limestone, and about 2 to 4 parts by weight of calcium sulphate having a particle size of about minus 200 mesh to treatment at temperatures of about 1000 to 1500 degrees centigrade, and leaching the calcined mixture with a calcium chloride solution.

4. A process for the production of lithium chloride which comprises subjecting a mixture of about 4 to 6 parts by weight of spodumene, about 4 to 6 parts by weight of limestone, and about 2 to 4 parts by weight of calcium sulphate having a particle size of about minus 200 mesh to treatment at temperatures of about 1000 to 1500 degrees centigrade, and leaching the calcined mixture with a calcium chloride solution.

5. A process for the production of pure lithium chloride which comprises subjecting a mixture of about 4 to 6 parts by weight spodumene, about 4 to 6 parts by weight limestone, and about 2 to 4 parts by weight of calcium sulphate having a particle size of about minus 200 mesh to treatment at temperatures of about 1000 to 1500 degrees centigrade; extracting said treated mixture with calcium chloride solution; treating said solution from the said extraction with sufficient barium chloride to substantially precipitate all sulphate ions, removing calcium and barium ions from solution by introducing therein lithium carbonate, separating the precipitated impurities from the impure lithium chloride solution; concentrating said impure lithium chloride solution sufficiently to precipitate a major portion of sodium and potassium chlorides, separating said sodium and potassium chlorides from said concentrated lithium chloride solution; evaporating said concentrated lithium chloride solution to substantially complete removal of the contained water; treating the solid lithium chloride with sufficient hot 2-ethylhexanol to dissolve only the lithium chloride; separating said 2-ethylhexanol solution of pure lithium chloride from any undissolved salts; treating said 2-ethylhexanol solution of lithium chloride with sufficient water to extract therefrom the lithium chloride; separating the two liquid phases; recovering the thus purified lithium chloride from the aqueous phase and recycling the 2-ethylhexanol.

6. A process wherein the sodium and potassium chloride residues as obtained in claim 5 are combined, dissolved in water and treated with sodium carbonate whereby the organic solvent and lithium carbonate separate from the aqueous solution and are recovered.

7. A process for the production of water soluble lithium compounds which comprises subjecting a mixture of about 5 parts by weight of spodumene, about 5 parts by weight of limestone, and about 3 parts by weight of calcium sulphate, having a particle size of about minus 200 mesh to treatment at temperatures of about 1000 to 1500 degrees centigrade, and leaching the calcined mixture with water to recover the water soluble lithium compound.

EARL T. HAYES.
FRANK P. WILLIAMS.
WOLDEMAR M. STERNBERG.

REFERENCES CITED

The following references are of record in the file of this patent:

UNITED STATES PATENTS

| Number | Name | Date |
| --- | --- | --- |
| 1,515,001 | Girsewald | Nov. 11, 1924 |
| 1,544,114 | Weidurann | June 30, 1925 |
| 1,936,002 | Waggonner | Nov. 21, 1933 |
| 2,021,987 | Colton | Nov. 26, 1935 |
| 2,021,988 | Corson et al. | Nov. 26, 1935 |
| 2,044,018 | Rosett | June 16, 1936 |
| 2,230,167 | Sivander | Jan. 28, 1941 |
| 2,413,644 | Nicholson | Dec. 31, 1946 |

FOREIGN PATENTS

| Number | Country | Date |
| --- | --- | --- |
| 6,626 | Great Britain | of 1908 |

OTHER REFERENCES

Mellor, Inorganic and Theoretical Chemistry, vol. 2, pages 442 and 443.